United States Patent
Salter et al.

(10) Patent No.: US 12,479,377 B2
(45) Date of Patent: Nov. 25, 2025

(54) MOTOR VEHICLE REMOTE POWER SYSTEMS WITH REMOVABLE POWER OUTLET BOXES

(71) Applicant: FORD GLOBAL TECHNOLOGIES, LLC, Dearborn, MI (US)

(72) Inventors: Stuart C. Salter, White Lake, MI (US); Michael John Harmon, Northville, MI (US); David Brian Glickman, Southfield, MI (US); Deborah M. Bjorge, Northville, MI (US); Hussain Z. Tajmahal, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 723 days.

(21) Appl. No.: 17/869,094

(22) Filed: Jul. 20, 2022

(65) Prior Publication Data

US 2024/0025361 A1 Jan. 25, 2024

(51) Int. Cl.
*H02J 7/00* (2006.01)
*B60R 16/03* (2006.01)
*B60W 60/00* (2020.01)
*H02G 11/02* (2006.01)

(52) U.S. Cl.
CPC ........... *B60R 16/03* (2013.01); *B60W 60/001* (2020.02); *H02G 11/02* (2013.01); *B60W 2510/18* (2013.01); *B60W 2554/4041* (2020.02)

(58) Field of Classification Search
CPC ...... B60R 16/02; B60R 16/03; B60W 60/001; B60W 2554/4041; B60W 2510/18; H02G 11/02; B60L 1/006

USPC ............... 191/12.4, 12.2 R; 307/9.1, 10.1; 320/109, 123

See application file for complete search history.

(56) References Cited

U.S. PATENT DOCUMENTS

| | | | |
|---|---|---|---|
| 7,000,746 B2 | 2/2006 | Mackin et al. | |
| 7,241,146 B1* | 7/2007 | Kim | B60R 16/0207 439/4 |
| 8,737,026 B2 | 5/2014 | Jeno et al. | |
| 10,501,032 B2 | 12/2019 | Secord | |
| 11,648,847 B1* | 5/2023 | Ng | B60L 58/12 320/109 |
| 2022/0037053 A1 | 2/2022 | Tiedge et al. | |

* cited by examiner

*Primary Examiner* — Zixuan Zhou
(74) *Attorney, Agent, or Firm* — Vichit Chea; Carlson, Gaskey & Olds, P.C.

(57) ABSTRACT

Remote power supply systems are disclosed for use on motor vehicles The remote power supply systems may power auxiliary devices separate from the vehicle. Exemplary remote power supply systems may include one or more removable power outlet boxes that include electrical power outlets for connecting the auxiliary devices. The electrical power outlets may be powered by a generator system of the vehicle. The removable power outlet box may be removed from the vehicle for repositioning the electrical power outlets at a distance away from the vehicle. A control module may command the vehicle to move toward the removable power outlet box when the box is removed from the vehicle and a predefined length of a cord has been unwound from a reel of the removable power outlet box.

20 Claims, 9 Drawing Sheets

MOTOR VEHICLE REMOTE POWER SYSTEMS WITH REMOVABLE POWER OUTLET BOXES

TECHNICAL FIELD

This disclosure relates generally to motor vehicles, and more particularly to vehicle remote power systems that include removable power outlet boxes for powering auxiliary devices separate from the vehicle.

BACKGROUND

Some motor vehicles include electrical power outlets that can be used to power auxiliary devices or loads separate from the vehicle. The electrical power outlets can be particularly useful for commercial vehicles and work trucks that are often at job sites and other areas that may lack an available grid power source. When at such sites, a user can power tools and other auxiliary devices through the vehicle's electrical power outlets.

SUMMARY

A vehicle remote power transfer system according to an exemplary aspect of the present disclosure includes, among other things, a removable power outlet box including an electrical power outlet, a reel, and a cord. The cord includes a first portion unwound from the reel and a second portion wound onto the reel. A control module is programmed to command the vehicle to operate in a Following Mode in which the vehicle autonomously moves in a direction toward the removable power outlet box when a length of the first portion exceeds a predefined threshold.

In a further non-limiting embodiment of the foregoing vehicle remote power transfer system, the electrical power outlet is movable to a location away from the vehicle by moving the removable power outlet box.

In a further non-limiting embodiment of either of the foregoing vehicle remote power transfer systems, a sensor system is configured to infer the length of the first portion based on a spring force or a number of wheel revolutions of the reel.

In a further non-limiting embodiment of any of the foregoing vehicle remote power transfer systems, the sensor system provides sensor input data to the control module for determining the length of the first portion.

In a further non-limiting embodiment of any of the foregoing vehicle remote power transfer systems, the control module is further programmed to command an alert when an obstruction is detected in a path of the vehicle or in response to detecting a reduced tension in the cord.

In a further non-limiting embodiment of any of the foregoing vehicle remote power transfer systems, the alert is presented on a human machine interface or a personal electronic device that is operably linked to the vehicle remote power transfer system.

In a further non-limiting embodiment of any of the foregoing vehicle remote power transfer systems, the control module is further programmed to command the vehicle to halt movement when the vehicle is within a threshold distance of the removable power outlet box or when the removable power outlet box is moved greater than a threshold distance away from the vehicle.

In a further non-limiting embodiment of any of the foregoing vehicle remote power transfer systems, the removable power outlet box includes a handle bar and a front panel that includes the electrical power outlet.

In a further non-limiting embodiment of any of the foregoing vehicle remote power transfer systems, the removable power outlet box includes a rotating cover.

In a further non-limiting embodiment of any of the foregoing vehicle remote power transfer systems, the removable power outlet box is movable between a docked position within a cavity of the vehicle and a deployed position in which the removable power outlet box is located a distance away from the vehicle.

A motor vehicle according to another exemplary aspect of the present disclosure includes, among other things, a cargo space at least partially established by a wall, the wall having an inner panel spaced from an outer panel to provide a cavity. A removable power outlet box is movable between a docked position and a deployed position relative to the cavity. A sensor system is configured to monitor an unwound length of a cord of the removable power outlet box. A control module is programmed to command the motor vehicle to operate in a Following Mode for autonomously moving toward the removable power outlet box when the unwound length of the cord exceeds a predefined threshold.

In a further non-limiting embodiment of the foregoing motor vehicle, a generator system is operable to supply power to an electrical power outlet of the removable power outlet box.

In a further non-limiting embodiment of either of the foregoing motor vehicles, the cord includes the unwound length and a wound length relative to a reel of the removable power outlet box.

In a further non-limiting embodiment of any of the foregoing motor vehicles, the sensor system is configured to infer the unwound length based on a spring force or a number of wheel revolutions of the reel.

In a further non-limiting embodiment of any of the foregoing motor vehicles, the reel is mounted within a sub-pocket of the cavity.

In a further non-limiting embodiment of any of the foregoing motor vehicles, a locking clip is adapted to lock the removable power outlet box in the docked position.

In a further non-limiting embodiment of any of the foregoing motor vehicles, the control module is further programmed to command an alert when an obstruction is detected in a path of the motor vehicle or in response to detecting a reduced tension in the cord.

In a further non-limiting embodiment of any of the foregoing motor vehicles, the control module is further programmed to command the motor vehicle to halt movement when the motor vehicle is within a threshold distance of the removable power outlet box or when the removable power outlet box is moved greater than a threshold distance away from the motor vehicle.

In a further non-limiting embodiment of any of the foregoing motor vehicles, the removable power outlet box includes a handle bar and a front panel that houses at least one electrical power outlet.

In a further non-limiting embodiment of any of the foregoing motor vehicles, the removable power outlet box includes a rotating cover positioned over a front panel that houses at least one electrical power outlet.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes remote power supply systems for motor vehicles. The remote power supply systems may power auxiliary devices separate from the vehicle. Exemplary remote power supply systems may include one or more removable power outlet boxes that include electrical power outlets for connecting the auxiliary devices. The electrical power outlets may be powered by a generator system of the vehicle. The removable power outlet box may be removed from the vehicle for repositioning the electrical power outlets at a distance away from the vehicle. A control module may command the vehicle to move toward the removable power outlet box when the box is removed from the vehicle and a predefined length of a cord of has been unwound from a reel the removable power outlet box. These and other features of this disclosure are discussed in greater detail in the following paragraphs of this detailed description.

Figure 1:
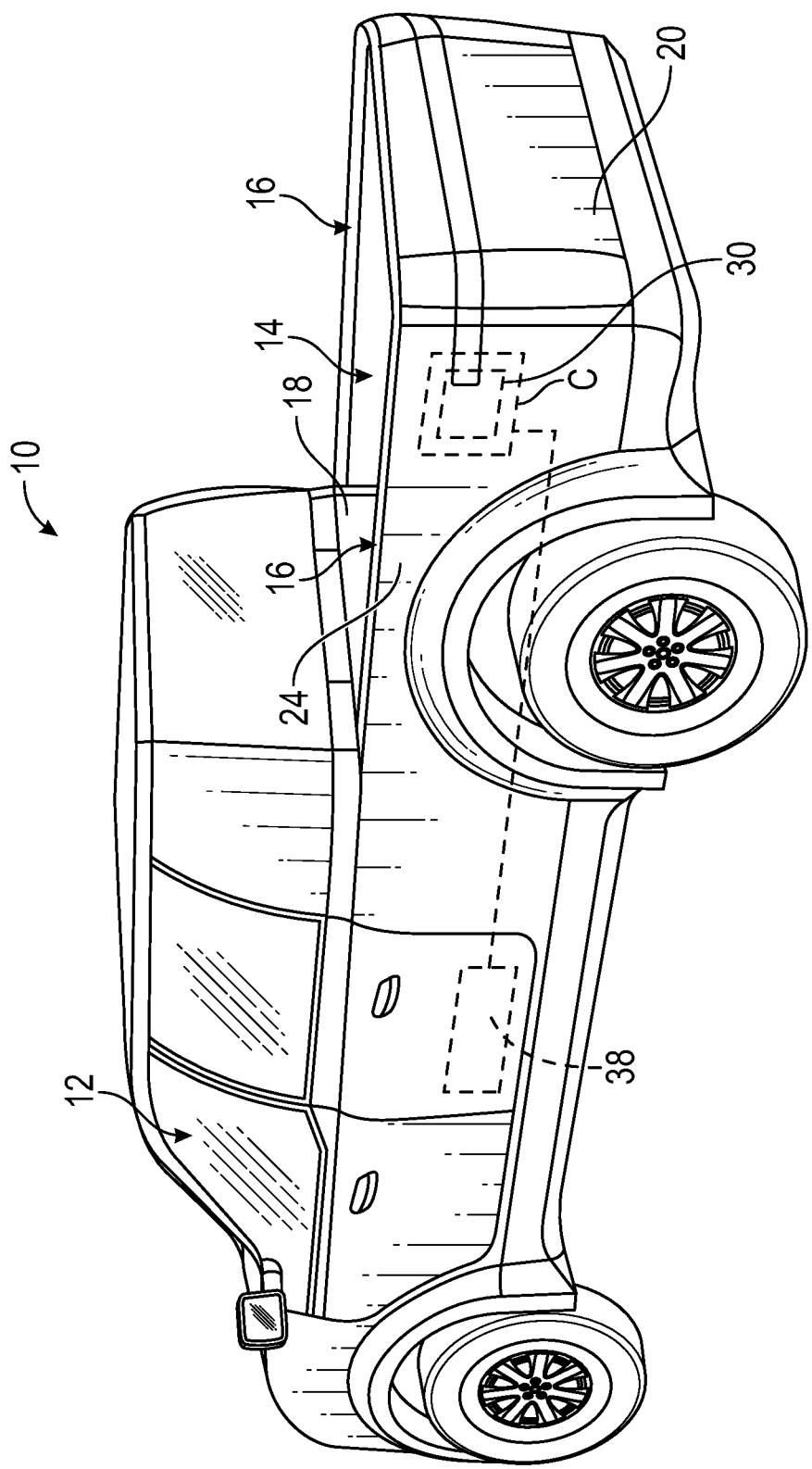
FIG. 1 schematically illustrates a motor vehicle.
Figure 2:
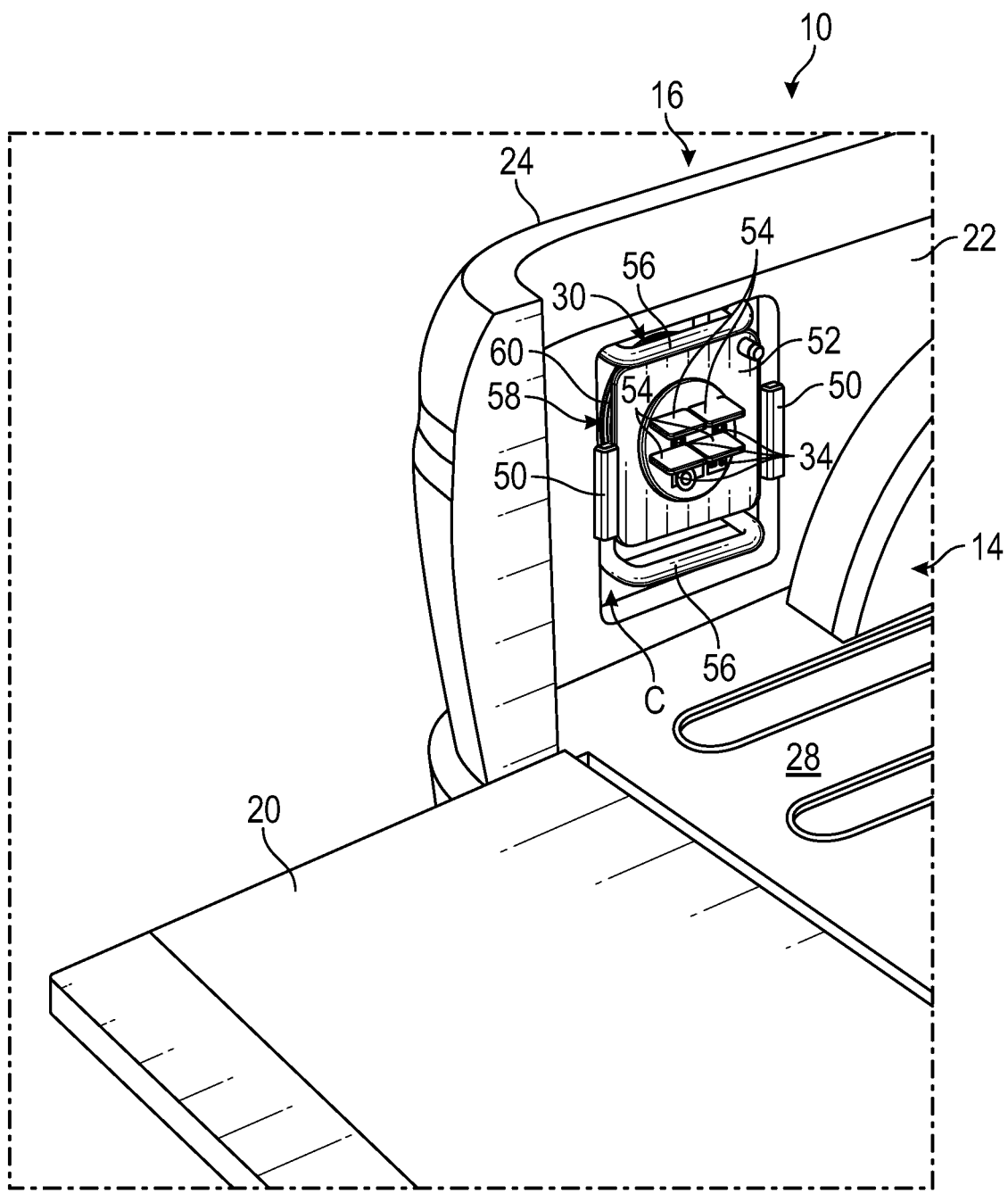
FIG. 2 illustrates a docked position of a removable power outlet box of the motor vehicle of FIG. 1.
Figure 3:
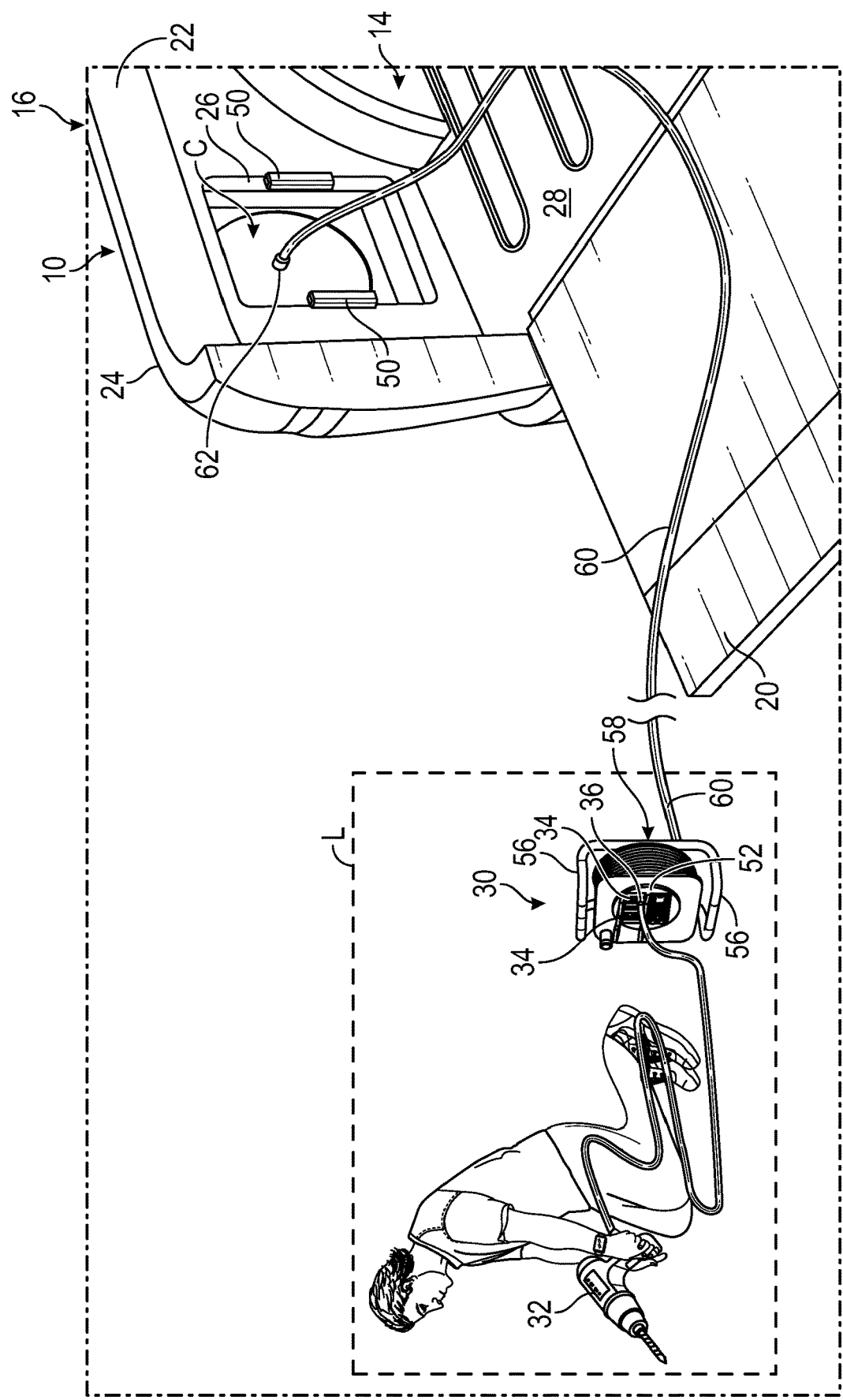
FIG. 3 illustrates a deployed position of the removable power outlet box of the motor vehicle of FIG. 1.

FIGS. 1, 2, and 3 schematically illustrate a motor vehicle 10 that includes a passenger cabin 12 and a cargo space 14 located rearward of the passenger cabin 12. The vehicle 10 could be a conventional, internal combustion engine powered vehicle, a traction battery powered electric or hybrid vehicle, an autonomous vehicle (i.e., a driverless vehicle), etc.

In an embodiment, the vehicle 10 is a pickup truck, and therefore the cargo space 14 is established by a cargo bed of the pickup truck. For example, the cargo space 14 may generally be defined by side walls 16, a front wall 18, and a tailgate 20 that acts as a rear wall of the cargo bed when closed. However, other vehicle configurations are also contemplated within the scope of this disclosure. For example, the vehicle 10 could be configured as a car, a truck, a van, a sport utility vehicle (SUV), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

At least one of the side walls 16 may include an inner panel 22 spaced from an outer panel 24 to provide a cavity C. FIGS. 1-3 illustrate select portions of the side wall 16 and cavity C provided on a driver side of the vehicle 10. However, the cavity C could alternatively or additionally be provided within the side wall 16 of the passenger side of the vehicle 10. As would be recognized by a person of ordinary skill in the art, the vehicle 10 could be equipped with one or more of the cavities C.

The inner panel 22 may include an aperture 26. The cavity C opens to the cargo space 14 through the aperture 26. In an embodiment, a perimeter of the aperture 26 is established entirely by the inner panel 22. In other embodiments, the aperture 26 may have its perimeter partially established by the inner panel 22, with a remaining portion of the perimeter of the aperture 26 provided by another structure, such as a floor 28 of the cargo bed, or could remain undefined.

A removable power outlet box 30 may be received within the cavity C. To the extent the vehicle 10 has more than one cavity C, one or more additional removable power outlet boxes 30 could be provided on the vehicle 10. In other words, the vehicle 10 could be equipped with one or more removable power outlet boxes 30 within the scope of this disclosure. The removable power outlet box 30 may be part of a remote power supply system (see FIG. 6) of the vehicle 10 that is configured for powering auxiliary devices 32 (see FIG. 3) located external to/remote from the vehicle 10. The auxiliary devices 32 could be any electrically powered device, including but not limited to, extension cords, construction tools, powered lawn equipment, recreational devices, campers or trailers, etc.

The removable power outlet box 30 may include one or more electrical power outlets 34 that provide an interface for connecting the auxiliary devices 32. A user can couple a plug 36 of the auxiliary device 32 to one of the electrical power outlets 34 for powering the auxiliary device 32 using power originating from the vehicle 10. The electrical power outlets 34 may include 120V outlet ports, 240V outlet ports, USB ports, etc., or any combination of these or other power outlet ports.

The vehicle 10 may further include a generator system 38, which may be part of a powertrain of the vehicle 10. The generator system 38 may be operably coupled to the removable power outlet box 30 for supplying power to the electrical power outlets 34.

Figure 4:
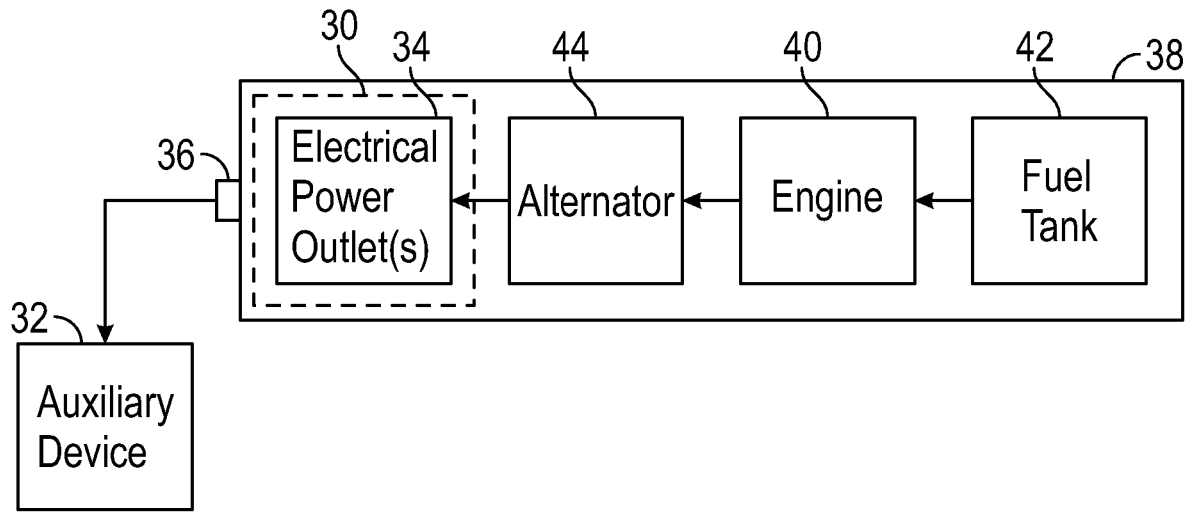
FIG. 4 schematically illustrates aspects of an exemplary generator system of a motor vehicle.

In implementations in which the vehicle 10 is a conventional motor vehicle, the generator system 38 may include an internal combustion engine 40, a fuel tank 42 for storing fuel (e.g., gasoline, diesel, etc.) that may be used to power the internal combustion engine 40, and an alternator 44 (see, e.g., FIG. 4). The alternator 44 may convert mechanical energy from the internal combustion engine 40 into electrical energy that can be utilized to provide power to the electrical power outlets 34 of the removable power outlet box 30 for powering the one or more auxiliary devices 32. In an embodiment, the alternator 44 is a 28 Volt alternator or battery, and operating the internal combustion engine 40 can generate up to 10 Kilowatts of power through the alternator 44 that can be directed to the removable power outlet box 30, such as during a power generation mode of the vehicle 10, for example.

Figure 5:
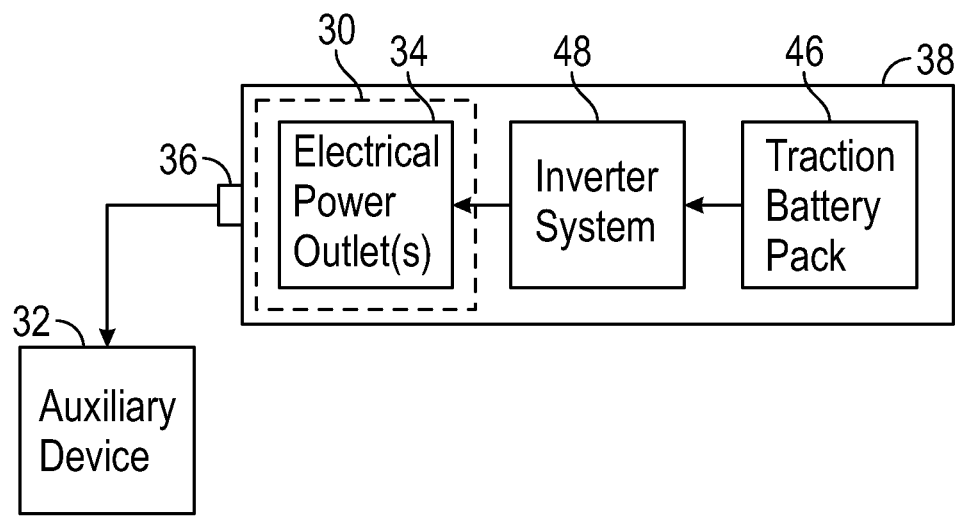
FIG. 5 schematically illustrates aspects of another exemplary generator system of a motor vehicle.

In implementations in which the vehicle 10 is a hybrid or battery electric vehicle, the generator system 38 may include a traction battery pack 46 and an inverter system 48 (see, e.g., FIG. 5). The traction battery pack 46 may be configured as a high voltage traction battery pack that includes a plurality of battery arrays (i.e., battery assemblies or groupings of battery cells) capable of outputting electrical power. The inverter system 48 may enable the transfer of power from the traction battery pack 46 to the removable power outlet box 30 for supplying power to the electrical power outlets 34 at the correct voltage and current levels for supporting the auxiliary devices 32. The power from the traction battery pack 46 could be supplied to the removable power outlet box 30 instead of or in addition to power supplied by an internal combustion engine.

The removable power outlet box 30 is shown in a docked position in FIG. 2. In the docked position, the power outlet box 30 is received within the cavity C and may be locked in place by one or more locking clips 50 (or any other locking mechanism). The locking clips 50 may be transitioned between locked and unlocked positions via a touch screen, a key fob, facial recognition, or any other known manner for removing the removable power outlet box 30 from the cavity C.

The locking clips 50 may engage a front panel 52 of the removable power outlet box 30 when locked. The electrical power outlets 34 may be mounted within the front panel 52. One or more of the electrical power outlets 34 may include a rotatable cover 54 for protecting the electrical power outlet 34 from inclement weather and other exterior elements.

The removable power outlet box 30 may include a handle bar 56 for grasping and moving the removable power outlet box 30. The handle bar 56 may also function as a stand for supporting the removable power outlet box 30 relative to a ground surface when removed from the cavity C of the vehicle 10.

The removable power outlet box 30 may further include a reel 58 and a cord 60 that may be wound and unwound relative to the reel 58. The cord 60 could include any length and/or wire gauge (e.g., 25 feet 14 AWG, 50 feet 12 AWG, 100 feet, 10 AWG, etc.). In an embodiment, the reel 58 is a spring loaded flywheel that is capable of automatically winding the cord 60 onto the reel 58, such as via spring tension forces. A pigtail 62 (see FIG. 3) of the cord 60 may plug into the vehicle 10 for operably coupling the removable power outlet box 30 to the generator system 38.

The removable power outlet box 30 is shown in a deployed position in FIG. 3. In the deployed position, the removable power outlet box 30 has been removed from the cavity C and then moved to a remote location L that is a distance apart from the vehicle 10. The remote location L could, for example, be inside a building or any other structure that is generally inaccessible by the vehicle 10. The cord 60 may unwind from the reel 58 as the removable power outlet box 30 is moved further away from the vehicle 10. One or more auxiliary devices 32 can then be plugged into the electrical power outlets 34 of the removable power outlet box 30 for powering the auxiliary devices 32 at the remote location L without requiring the user to relocate the vehicle 10 all the way to or inside the remote location L.

Notably, the removable power outlet box 30 may be utilized to power the one or more auxiliary devices 32 from either the stowed position or the deployed position.

There may be situations in which the length of the cord 60 is insufficient to reach the remote location L. This disclosure is therefore directed to vehicle remote power supply systems that include features for increasing the usability and user satisfaction of the removable power outlet box 30.

Figure 6:
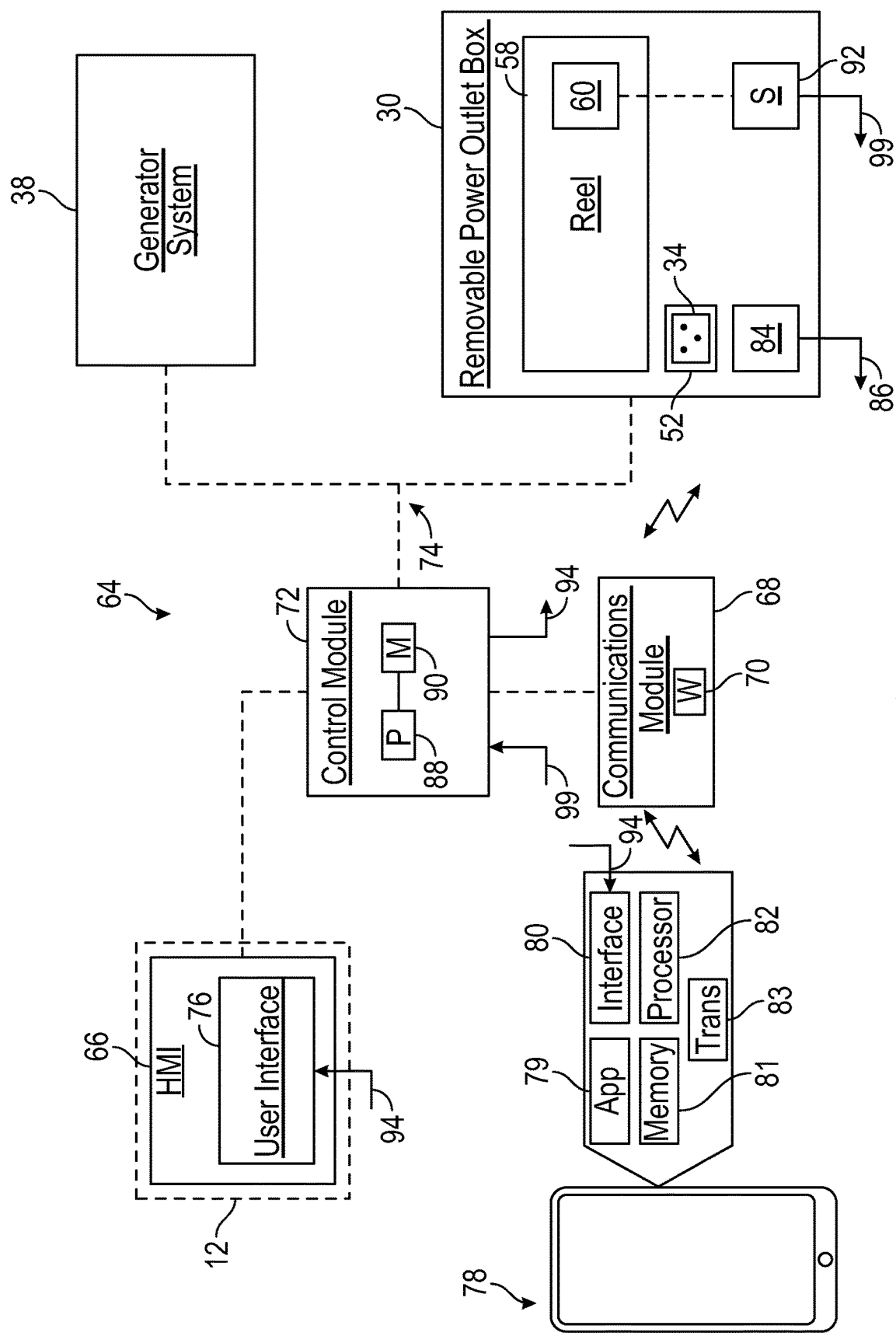
FIG. 6 schematically illustrates an exemplary remote power supply system for a motor vehicle.

FIG. 6, with continued reference to FIGS. 1-5, schematically illustrates a remote power supply system 64 that may be provided on the vehicle 10. The remote power supply system 64 may, for example, enable the vehicle 10 to operate in the power generation mode for powering one or more auxiliary devices 32 that are separate/remote from the vehicle 10. Moreover, as further explained below, the remote power supply system 64 may be configured to control the vehicle 10 in a "Following Mode" for autonomously moving toward the removable power outlet box 30 when certain preconditions are met.

The remote power supply system 64 may include the removable power outlet box 30, the generator system 38, a human machine interface (HMI) 66, a communications module 68, and a control module 72. These components may be interconnected and in electronic communication with one another over a communication bus 74. The communication bus 74 may be a wired communication bus such as a controller area network (CAN) bus, or a wireless communication bus such as Wi-Fi, Bluetooth®, Ultra-Wide Band (UWB), etc.

The HMI 66 may be located within the passenger cabin 12 of the vehicle 10 and may include various user interfaces for displaying information to the vehicle occupants and for allowing the vehicle occupants to enter information into the HMI 66. The vehicle occupants may interact with the user interfaces via touch screens, tactile buttons, audible speech, speech synthesis, etc. In an embodiment, the HMI 66 is part of an in-dash infotainment system of the vehicle 10. However, other configurations are further contemplated within the scope of this disclosure.

The HMI 66 may include one or more user interfaces 76 dedicated to functionality associated with the remote power supply system 64, and more particularly, to functionality associated with the removable power outlet box 30. The one or more user interfaces 76 may present power generation related information to a user. Non-limiting examples of the type of power generation information that may be displayed within the user interfaces 76 include the amount of power being drawn from each electrical power outlet 34, the efficiency of the power transfer through the cord alerts related to overloading/overtemperature conditions, etc.

The one or more user interfaces 76 may further enable the user to engage or disengage the "Following Mode" feature. The one or more user interfaces 76 could additionally be used to allow the user to lock or unlock the locking clips 50 relative to the removable power outlet box 30.

The user could alternatively or additionally interface with (e.g., over a cloud-based server system) the remote power supply system 64 with a personal electronic device 78 (e.g., a smart phone, tablet, computer, wearable smart device, etc.). The personal electronic device 78 in most implementations belongs to the owner/user of the vehicle 10. The personal electronic device 78 may include an application 79 (e.g., FordPass™ or another similar application) that includes programming to allow the user to employ one or more user interfaces 80 for setting or controlling certain aspects of the remote power supply system 64. Power generation related information may be presented to the user within one or more of the user interfaces 80. The user may also engage or disengage the "Following Mode" feature and/or lock or unlock the locking clips 50 relative to the removable power outlet box via the user interfaces 80. The application 79 may be stored in memory 81 of the personal electronic device 78 and may be executed by a processor 82 of the personal electronic device 78. The personal electronic device 78 may additionally include a transceiver 83 that is configured to communicate with the remote power supply system 64, such as via the communications module 68.

The communications module 68 may be configured for achieving bidirectional communications between the remote power supply system 64 and each of the personal electronic device 78 and the removable power outlet box 30. For example, the communications module 68 may include one or more wireless devices that is operable to facilitate communications between the user and the remote power supply system 64. The wireless devices 70 may be imbedded or otherwise mounted at various locations of the vehicle 10, such as within the front bumper, rack, molding, doors, in-vehicle components, etc. In an embodiment, the wireless devices are Bluetooth® Low Energy (BLE) transceivers configured to receive and/or emit low energy signals as a way to detect and communicate with participating users. However, other types of wireless devices (e.g., WiFi, V2V, etc.) are also contemplated within the scope of this disclosure.

As shown schematically, the removable power outlet box 30 may also include a wireless device 84 (e.g., another BLE transceiver) configured to communicate with the wireless device(s) 70 of the communications module 68 over a wireless connection. The wireless connection may be a BLE connection, a Wi-Fi connection, or any other type of wireless connection. In an embodiment, the wireless device 84 of the removable power outlet box 30 is adapted to periodically (e.g., about every half-second or any other time interval) broadcast wireless signals 86 that include information pertinent to the current location of the removable power outlet box 30, information concerning whether the removable power outlet box 30 is currently stationary or moving, etc. The wireless signals 86 may be received by the wireless devices 70 of the communications module 68. Based on the wireless signals 86, the communications module 68 may be configured to determine the approximate distance and direction of movement of the removable power outlet box 30 relative to the vehicle 10. This determination may include the use of various location tracking techniques, including but not limited to proximity, triangulation, and lateration methods. During certain situations, the communications module 68 may send signals to the control module 72 representative of the location of the removable power outlet box 30.

The control module 72 may include both hardware and software and could be part of an overall vehicle control system, such as a vehicle system controller (VSC), or could alternatively be a stand-alone controller separate from the VSC. In an embodiment, the control module 72 is programmed with executable instructions for interfacing with and commanding operation of various components of the remote power supply system 64. Although shown as separate modules within the highly schematic depiction of FIG. 6, the HMI 66, the communications module 68, and the control module 72 could be integrated together as part of common module of the vehicle 10.

The control module 72 may include a processor 88 and non-transitory memory 90 for executing various control strategies and modes associated with the remote power supply system 64. The processor 88 may be a custom made or a commercially available processor, a central processing unit (CPU), or generally any device for executing software instructions. The memory 90 can include any one or combination of volatile memory elements and/or nonvolatile memory elements. The processor 88 may be operably coupled to the memory 90 and may be configured to execute one or more programs stored in the memory 90 based on various inputs received from other devices associated with the remote power supply system 64.

The control module 72 may be programmed to control the vehicle 10 in the "Following Mode" when certain preconditions exist. For example, the "Following Mode" may automatically be executed when a predefined length of the cord 60 has been unwound from the reel 58. In an embodiment, based at least on sensor input data 99 received from a sensor system 92 associated with the removable power outlet system 30, the control module 72 may be programmed to calculate an unwound length of the cord 60. The unwound length represents the length of the cord 60 that has been unwound from the reel 58. At any given point of usage, the cord 60 will have both an unwound length and a wound length that can be determined by the control module 72.

In some implementations, the sensor system 92 may include a strain gauge that can be mounted to a retraction mechanism (e.g., a spring) of the reel 58. The strain gauge may be configured to measure a force of the retraction mechanism and then correlate that force (e.g., via one or more look-up tables stored in the memory 90) to infer the unwound length of the cord 60. In other implementations, the sensor system 92 could alternatively or additionally include an optical scanner/mechanical counter that can be mounted to the reel 58. The optical scanner/mechanical counter may be configured to determine how many wheel revolutions of the reel 58 have occurred and then correlate the wheel revolutions (e.g., via one or more look-up tables stored in the memory 90) to infer the unwound length of the cord 60. Other implementations of the sensor system 92 (e.g., CHMSL camera, radar, etc.) could also be possible for determining the unwound length of the cord 60 at any given point of usage of the removable power outlet box 30.

The control module 72 may be programmed to command the vehicle to enter the "Following Mode" when the unwound length exceeds a predefined threshold. In an embodiment, the predefined threshold may be at least 70% of a total length of the cord 60. However, other threshold lengths could alternatively be set as the predefined threshold.

As further part of executing the "Following Mode," the control module 72 may be programmed to locate the removable power outlet box 30 (e.g., via inputs received from the communications module 68) and then command the vehicle to begin backing up in direction toward the removable power outlet box 30. The cord 60 may be automatically wound onto the reel 58 as the vehicle 10 backs up. The sensor input data 99 may be utilized by the control module 72 in order to maintain a fixed tension on the cord 60 as the vehicle 10 backs up. When the tension in the cord drops (e.g., due to slack in the cord 60), the control module 72 may command the vehicle 10 to stop backing up.

In another embodiment, the control module 72 may be further programmed to command an alert 94 to the user when an obstruction is detected in the vehicle path or when a drop in tension in the cord 60 is detected by the senor system 92. The alert 94 may take the form of a message that can be displayed on one or more user interfaces 76 of the HMI 66 and/or the user interface(s) 80 of the personal electronic device 78. The alert 94 may further include prompts that are designed to entice the user to re-engage the "Following Mode" feature.

In yet another embodiment, the control module 72 may be further programmed to halt the movement of the vehicle 10 when the vehicle 10 is within a threshold distance of the removable power outlet box 30. In yet another embodiment, the control module 72 may be programmed to halt the movement of the vehicle 10 when the removable power outlet box 30 moves greater than a threshold distance further away from the vehicle 10.

Figure 7:
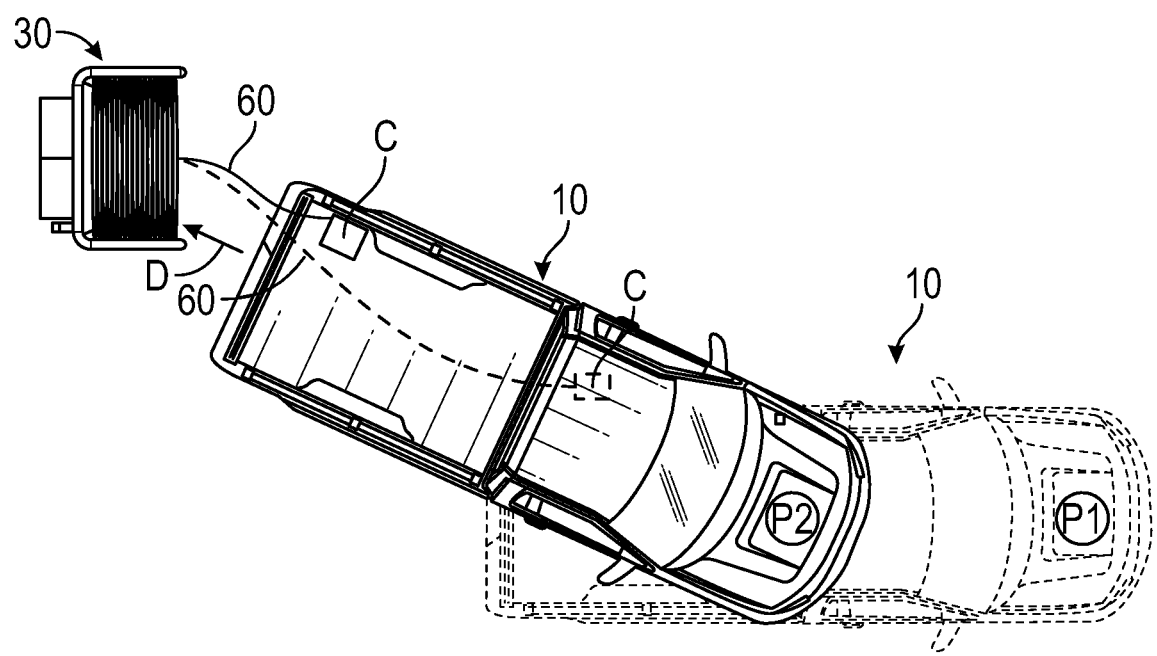
FIG. 7 schematically illustrates a "Following Mode" of a motor vehicle.

FIG. 7 schematically illustrates an exemplary operation of the vehicle 10 during the "Following Mode." The vehicle 10 may begin parked in a first position P1. Once an unwound length of the cord 60 exceeds a predefined threshold, the vehicle 10 may be commanded to back up in a direction D toward the removable power outlet box 30. The vehicle 10 may thus be moved to a second position P2 that is displaced from the first position P1. The vehicle 10 is closer to the removable power outlet box 30 in the second position P2 than it is in the first position P1.

Figure 8:
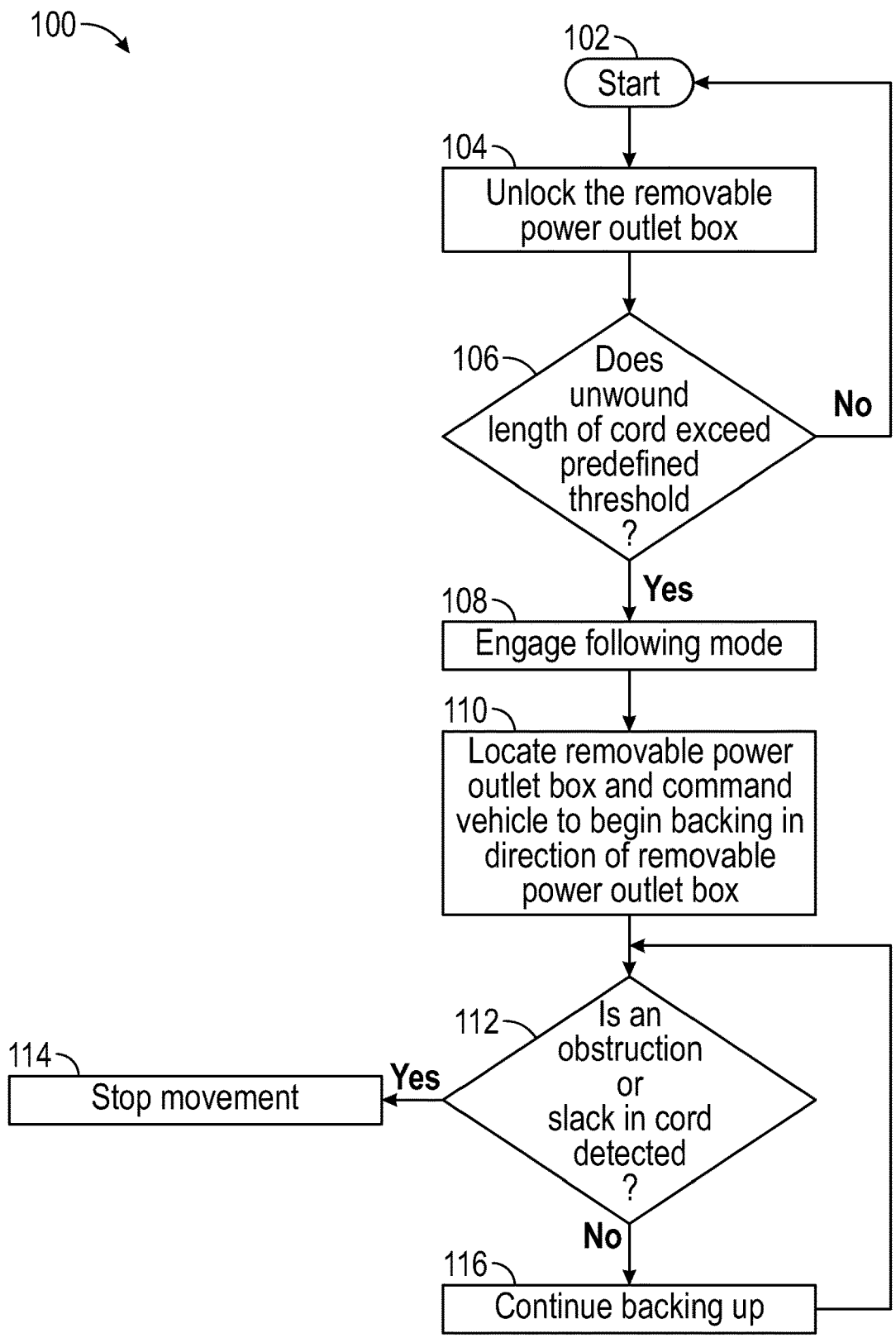
FIG. 8 schematically illustrates an exemplary method for controlling a motor vehicle equipped with a removable power outlet box.

FIG. 8, with continued reference to FIGS. 1-7, schematically illustrates an exemplary method 100 for controlling the vehicle 10 during the "Following Mode." The method 100 may include a greater or fewer number of steps than recited below, and the exact order of the steps is not intended to limit this disclosure.

The method may begin at block 102. At block 104, the removable power outlet box 30 may be unlocked relative to the cavity C. At block 106, the method 100 may determine whether or not an unwound length of the cord 60 exceeds a predefined threshold length. If YES, the method 100 may proceed to block 108. At this step, the method 100 may engage the "Following Mode" of the vehicle 10. Then, at block 110, the method 100 may locate the removable power outlet box 30 and command the vehicle 10 to begin backing up in the direction of the removable power outlet box 30.

At block 112, the method 100 may determine whether an obstruction is detected within a path of the vehicle 10 or whether slack is detected in the cord 60. If YES, the vehicle 10 is stopped from further backing up at block 114. If NO, the vehicle 10 continues backing up at block 116. The method may then return to block 112 as part of a closed loop system.

Figures 9, 10:
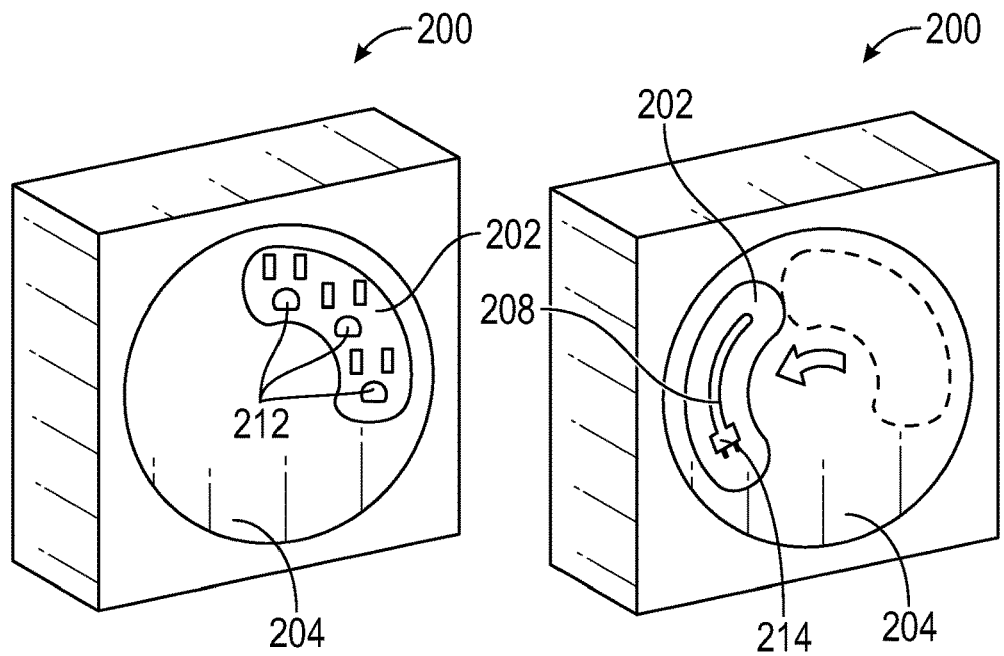
FIGS. 9, 10, and 11 illustrate another exemplary removable power outlet box.
Figure 11:
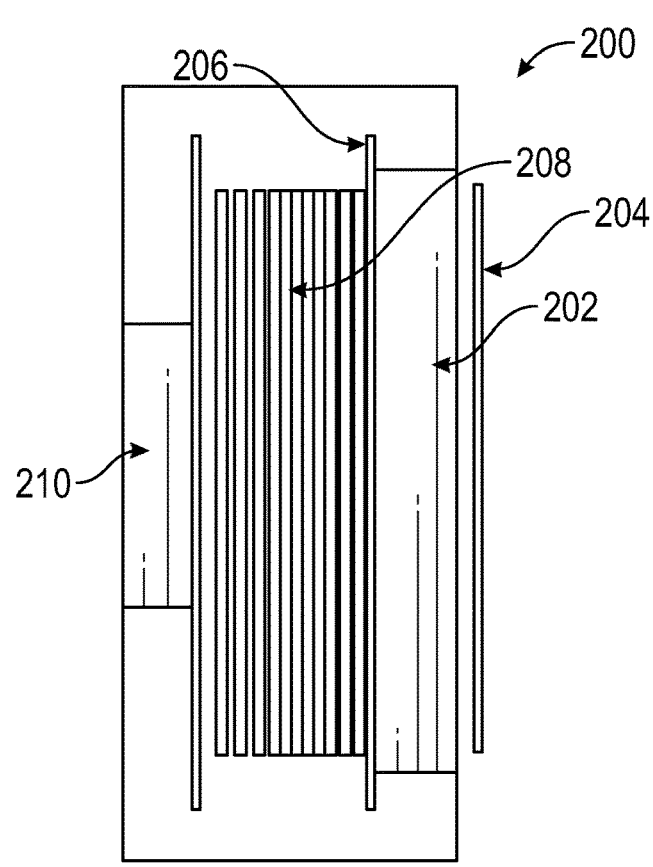

FIGS. 9, 10, and 11 illustrate another exemplary removable power outlet box 200 for use with the vehicle 10. Similar to the removable power outlet box 30 discussed above, the removable power outlet box 200 may be moved between a docked position within a cargo bed cavity and a deployed position in which the box has been relocated to a remote location some distance away from the vehicle 10.

In this embodiment, the removable power outlet box 200 may include a front panel 202, a rotating cover 204, a reel 206, a cord 208, and a clutch system 210. One or more electrical power outlets 212 may be provided on the front panel 202. The electrical power outlets 212 provide an interface for connecting and powering auxiliary devices.

The rotating cover 204 may be adapted to rotate relative to the front panel 202. For example, the rotating cover 204 may rotate in a first direction for exposing the electrical power outlets 212 (see FIG. 9) and may rotate in a second direction for exposing a pigtail 214 of the cord 208.

The cord 208 may be wound and unwound relative to the reel 206. The reel 206 may be a spring loaded flywheel that is capable of automatically winding the cord 208 onto the reel 206, such as via spring tension forces. The clutch system 210 may control the reel 206. In an embodiment, the clutch system 210 may be configured to sense a tension of the cord 208 and release the reel 206 when the tension exceeds a predefined threshold. The clutch system 210 may further be configured to reel in the cord 208 when the vehicle moves toward the removable power outlet box 200.

Figure 12:
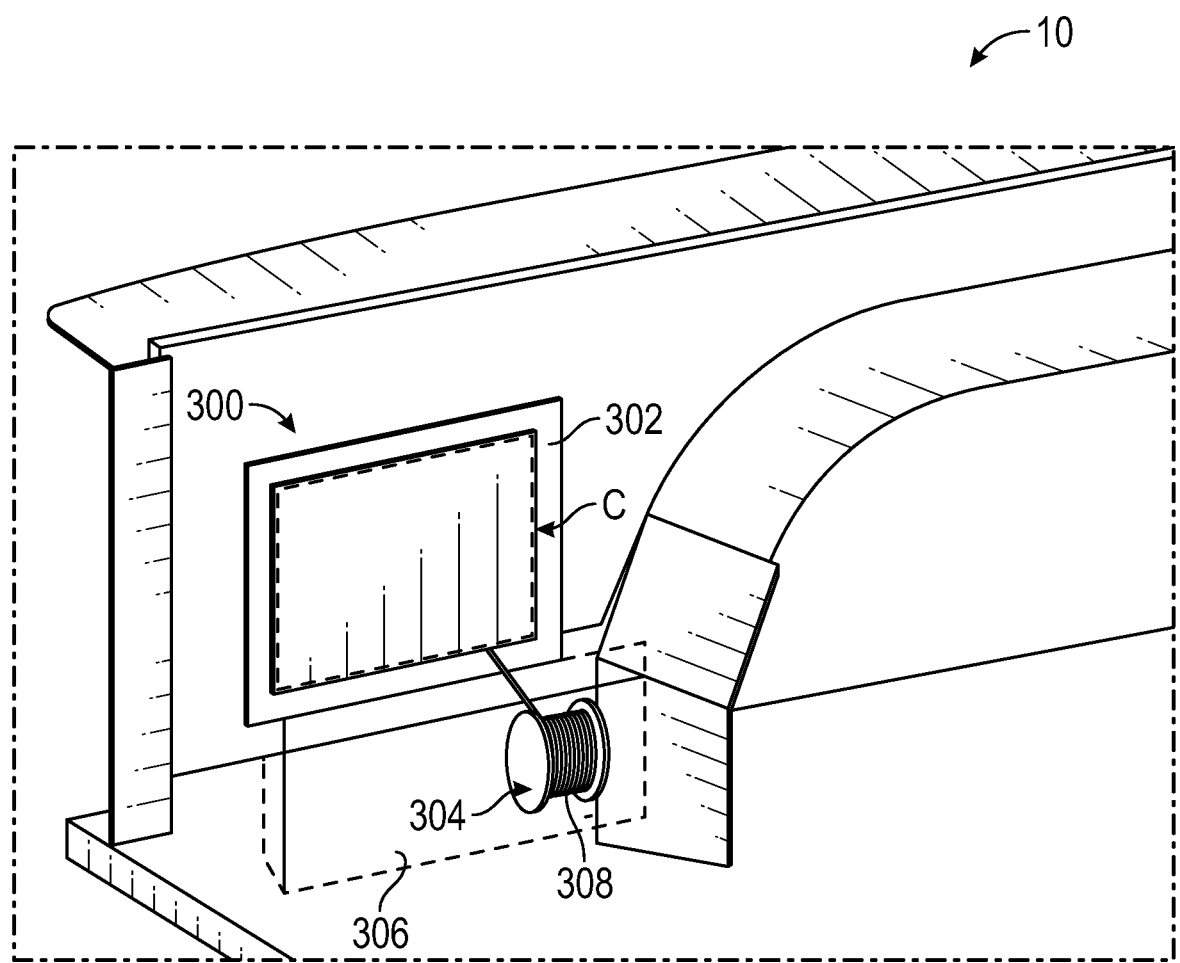
FIG. 12 illustrates yet another exemplary removable power outlet box.

In the embodiments described above, the reel is an integral component of the removable power outlet box. However, other implementations are further contemplated within the scope of this disclosure. For example, as shown in FIG. 12, a removable power outlet box 300 may include a front panel 302 and a reel 304 that is packaged separately from the front panel 302. The front panel 302 may be removed from the cavity C of the vehicle 10, while the reel 304 remains mounted in a sub-pocket 306 of the cavity C during all uses and positions of the removable power outlet box 300. In this embodiment, a cord 308 is operably coupled to both the front panel 302 and the reel 304.

The vehicle remote power supply systems of this disclosure may provide removable power outlet boxes, thereby ensuring that one or more power outlets are always available to the user for powering auxiliary devices remote from the vehicle. The remote power supply system may be controlled in a "Following Mode" for providing a more convenient and satisfying user experience.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle remote power transfer system, comprising:
    a removable power outlet box including an electrical power outlet, a reel, and a cord;
    wherein the cord includes a first portion unwound from the reel and a second portion wound onto the reel; and
    a control module programmed to command a vehicle to operate in a Following Mode in which the vehicle autonomously moves in a direction toward the removable power outlet box when a length of the first portion exceeds a predefined threshold.

2. The vehicle remote power transfer system as recited in claim 1, wherein the electrical power outlet is movable to a location away from the vehicle by moving the removable power outlet box.

3. The vehicle remote power transfer system as recited in claim 1, comprising a sensor system configured to infer the length of the first portion based on a spring force or a number of wheel revolutions of the reel.

4. The vehicle remote power transfer system as recited in claim 3, wherein the sensor system provides sensor input data to the control module for determining the length of the first portion.

5. The vehicle remote power transfer system as recited in claim 1, wherein the control module is further programmed to command an alert when an obstruction is detected in a path of the vehicle or in response to detecting a reduced tension in the cord.

6. The vehicle remote power transfer system as recited in claim 5, wherein the alert is presented on a human machine interface or a personal electronic device that is operably linked to the vehicle remote power transfer system.

7. The vehicle remote power transfer system as recited in claim 1, wherein the control module is further programmed to command the vehicle to halt movement when the vehicle is within a threshold distance of the removable power outlet box or when the removable power outlet box is moved greater than a threshold distance away from the vehicle.

8. The vehicle remote power transfer system as recited in claim 1, wherein the removable power outlet box includes a handle bar and a front panel that includes the electrical power outlet.

9. The vehicle remote power transfer system as recited in claim 1, wherein the removable power outlet box includes a rotating cover.

10. The vehicle remote power transfer system as recited in claim 1, wherein the removable power outlet box is movable between a docked position within a cavity of the vehicle and a deployed position in which the removable power outlet box is located a distance away from the vehicle.

11. A motor vehicle, comprising:
a cargo space at least partially established by a wall, the wall having an inner panel spaced from an outer panel to provide a cavity;
a removable power outlet box movable between a docked position and a deployed position relative to the cavity;
a sensor system configured to monitor an unwound length of a cord of the removable power outlet box; and
a control module programmed to command the motor vehicle to operate in a Following Mode for autonomously moving toward the removable power outlet box when the unwound length of the cord exceeds a predefined threshold.

12. The motor vehicle as recited in claim 11, comprising a generator system operable to supply power to an electrical power outlet of the removable power outlet box.

13. The motor vehicle as recited in claim 11, wherein the cord includes the unwound length and a wound length relative to a reel of the removable power outlet box.

14. The motor vehicle as recited in claim 13, wherein the sensor system is configured to infer the unwound length based on a spring force or a number of wheel revolutions of the reel.

15. The motor vehicle as recited in claim 13, wherein the reel is mounted within a sub-pocket of the cavity.

16. The motor vehicle as recited in claim 11, comprising a locking clip adapted to lock the removable power outlet box in the docked position.

17. The motor vehicle as recited in claim 11, wherein the control module is further programmed to command an alert when an obstruction is detected in a path of the motor vehicle or in response to detecting a reduced tension in the cord.

18. The motor vehicle as recited in claim 11, wherein the control module is further programmed to command the motor vehicle to halt movement when the motor vehicle is within a threshold distance of the removable power outlet box or when the removable power outlet box is moved greater than a threshold distance away from the motor vehicle.

19. The motor vehicle as recited in claim 11, wherein the removable power outlet box includes a handle bar and a front panel that houses at least one electrical power outlet.

20. The motor vehicle as recited in claim 11, wherein the removable power outlet box includes a rotating cover positioned over a front panel that houses at least one electrical power outlet.

* * * * *